United States Patent
Schmit et al.

(10) Patent No.: US 11,786,993 B2
(45) Date of Patent: Oct. 17, 2023

(54) METHOD FOR PRODUCING A PRECOATED STEEL SHEET AND ASSOCIATED SHEET

(71) Applicant: ArcelorMittal, Luxembourg (LU)

(72) Inventors: Francis Schmit, Clermont (FR); Quentin Bernardi, Paris (FR)

(73) Assignee: ARCELORMITTAL, Luxembourg (LU)

( * ) Notice: Subject to any disclaimer, the term of this patent is extended or adjusted under 35 U.S.C. 154(b) by 270 days.

(21) Appl. No.: 16/757,451

(22) PCT Filed: Oct. 19, 2018

(86) PCT No.: PCT/IB2018/058129
§ 371 (c)(1),
(2) Date: Apr. 20, 2020

(87) PCT Pub. No.: WO2019/077394
PCT Pub. Date: Apr. 25, 2019

(65) Prior Publication Data
US 2021/0107092 A1     Apr. 15, 2021

(30) Foreign Application Priority Data

Oct. 20, 2017  (WO) .................. PCT/IB2017/056546

(51) Int. Cl.
*B23K 26/322*     (2014.01)
*B23K 26/362*     (2014.01)
(Continued)

(52) U.S. Cl.
CPC .......... *B23K 26/322* (2013.01); *B23K 26/362* (2013.01); *B23K 26/40* (2013.01);
(Continued)

(58) Field of Classification Search
None
See application file for complete search history.

(56) References Cited

U.S. PATENT DOCUMENTS

2008/0011720 A1   1/2008  Briand et al.
2009/0123740 A1*  5/2009  Hanaki .................. B23K 26/38
                                                      428/337
(Continued)

FOREIGN PATENT DOCUMENTS

RU     2403309 C2    11/2010
RU     2620841 C1     5/2017

OTHER PUBLICATIONS

International Search Report issued in connection with International application No. PCT/IB2018/058129.

(Continued)

*Primary Examiner* — Xiaobei Wang
(74) *Attorney, Agent, or Firm* — Davidson, Davidson & Kappel, LLC (57) ABSTRACT

A method for producing a precoated steel sheet (1) includes providing a precoated steel strip comprising a steel substrate (3) having, on at least one of its main faces, a precoating comprising an intermetallic alloy layer and a metallic alloy layer. The metallic alloy layer is a layer of aluminum, a layer of aluminum alloy or a layer of aluminum-based alloy. The method also includes laser cutting said precoated steel strip so as to obtain at least one precoated steel sheet (1) comprising a cut edge surface (13) resulting from the cutting operation. The cut edge surface (13) includes a substrate region (14) and a precoating region (15) and the thickness of the precoated steel sheet (1) is comprised between 0.8 mm and 5 mm. The laser cutting is carried out such that it results directly in a corrosion-improved zone (19) of the cut edge surface (13). The surface fraction of aluminum on the substrate region (14) of the corrosion-improved zone (19) is greater than or equal to 9% and the surface fraction of aluminum on the bottom half of the substrate region (14) of (Continued)

the corrosion-improved zone (19) is greater than or equal to 0.5%.

36 Claims, 6 Drawing Sheets

(51) Int. Cl.
| | |
|---|---|
| *B23K 26/40* | (2014.01) |
| *B32B 15/01* | (2006.01) |
| *C21D 9/50* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/28* | (2006.01) |
| *C22C 38/32* | (2006.01) |
| *B23K 101/18* | (2006.01) |
| *B23K 103/20* | (2006.01) |
| *B23K 26/14* | (2014.01) |
| *B23K 26/38* | (2014.01) |

(52) U.S. Cl.
CPC .............. *B32B 15/012* (2013.01); *C21D 9/50* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *B23K 26/14* (2013.01); *B23K 26/38* (2013.01); *B23K 2101/185* (2018.08); *B23K 2103/20* (2018.08); *C21D 2211/001* (2013.01); *Y10T 428/12757* (2015.01)

(56) References Cited

U.S. PATENT DOCUMENTS

| | | |
|---|---|---|
| 2009/0220815 A1 | 9/2009 | Canourgues et al. |
| 2012/0012570 A1 | 1/2012 | Briand et al. |
| 2016/0036809 A1 | 12/2016 | Breuer et al. |
| 2016/0368094 A1 | 12/2016 | Breuer et al. |
| 2019/0176270 A1* | 6/2019 | Hara .................. B23K 26/0853 |

OTHER PUBLICATIONS

International Search Report issued in connection with International application No. PCT/IB2017/056546.

\* cited by examiner

METHOD FOR PRODUCING A PRECOATED STEEL SHEET AND ASSOCIATED SHEET

The present invention concerns a method for producing a precoated steel sheet from a precoated steel strip comprising a steel substrate having, on at least one of its faces, a precoating, the precoating comprising an intermetallic alloy layer and a metallic alloy layer extending over the intermetallic alloy layer, the metallic alloy layer being a layer of aluminum, a layer of aluminum alloy or a layer of aluminum-based alloy.

BACKGROUND

Such precoated steel sheets may be obtained from a precoated steel strip through laser or mechanical cutting. Generally, the precoated steel sheets thus obtained are then stored for some time, awaiting transportation to the client and/or further transformation, for example forming into the final part.

SUMMARY

The inventors of the present invention have observed that, during storage, corrosion tends to develop in the form of red rust at the edges of the precoated steel sheets.

Such a corrosion is not desirable. Indeed, it results in an undesirable deterioration of the appearance of the sheets during storage. Furthermore, it results in a degradation of the properties of the product, and may result in a loss in stampability at the edges.

One object of the present disclosure is to provide precoated steel sheets which have a good corrosion resistance, including on their edges, at reduced cost.

A method for producing a precoated steel sheet is provided comprising the successive steps of:
  providing a precoated steel strip comprising a steel substrate having, on at least one of its main faces, a precoating, the precoating comprising an intermetallic alloy layer and a metallic alloy layer extending over the intermetallic alloy layer, the metallic alloy layer being a layer of aluminum, a layer of aluminum alloy or a layer of aluminum-based alloy,
  laser cutting said precoated steel strip so as to obtain at least one precoated steel sheet, said precoated steel sheet comprising a cut edge surface resulting from the cutting operation, the cut edge surface comprising a substrate region and a precoating region and the thickness of the precoated steel sheet being comprised between 0.8 mm and 5 mm,
wherein the laser cutting is carried out such that it results directly in a corrosion-improved zone of the cut edge surface, extending over the entire height of the cut edge surface and over a length smaller than or equal to the length of the cut edge surface, the surface fraction of aluminum on the substrate region of the corrosion-improved zone of the cut edge surface directly resulting from the laser cutting operation being greater than or equal to 9% and the surface fraction of aluminum on the bottom half of the substrate region of the corrosion-improved zone of the cut edge surface directly resulting from the laser cutting operation is greater than or equal to 0.5%.

According to particular embodiments, the method may comprise one or more of the following features, taken alone or according to any possible combination:
  the laser cutting is carried out such that, in said corrosion-improved zone of the cut edge surface, the surface fraction of aluminum on the substrate region directly resulting from the laser cutting operation is comprised between 9% and 70%,
  the laser cutting step is performed using an inert gas as an assist gas,
  the assist gas is chosen among argon, helium, nitrogen and mixtures of these gases,
  the laser cutting step is performed using a $CO_2$ laser,
  in order to obtain the corrosion-improved zone, the laser cutting is performed using a laser cutting linear energy E comprised between 0.18 kJ/cm and 0.29 kJ/cm and an assist gas pressure P comprised between $P_{min}$=54.5× E−7.8 bars and $P_{max}$, whereby $P_{max}$ is equal to 14 bars for E≤0.24 kJ/cm and $P_{max}$ is equal to −80×E+33.2 bars for E>0.24 kJ/cm,
  the laser cutting step is performed using a solid state laser, for example an Nd:YAG laser, a fiber laser, a disk laser or a diode laser,
  in order to obtain the corrosion-improved zone, the laser cutting is performed using a laser cutting linear energy E comprised between 0.08 kJ/cm and 0.34 kJ/cm and an assist gas pressure P comprised between $P_{min}$ and $P_{max}$, whereby $P_{min}$=64.3×E−3.9 bars when E>0.2 kJ/cm and $P_{min}$=9 bars when E≤0.2 kJ/cm and $P_{max}$ is equal to 28.6×E+8.3 bars,
  the laser cutting is carried out such that, in the corrosion-improved zone of the cut edge surface, the surface fraction of aluminum on the substrate region of the cut edge surface of the precoated steel sheet directly resulting from the laser cutting operation is greater than or equal to 9% and the surface fraction of aluminum directly resulting from the laser cutting operation on the bottom half of the substrate region of the cut edge surface is greater than or equal to 1.5%,
  in order to obtain the corrosion-improved zone, the laser cutting is performed using a $CO_2$ laser and using a laser cutting linear energy E comprised between 0.18 kJ/cm and 0.29 kJ/cm and an assist gas pressure P comprised between $P_{min}$=72.7×E−11.1 bars and $P_{max}$, whereby $P_{max}$ is equal to 14 bars for E≤0.24 kJ/cm and $P_{max}$ is equal to −80×E+33.2 bars for E>0.24 kJ/cm,
  the laser cutting is further carried out such that, in said corrosion-improved zone, the ratio of the surface fraction of aluminum on the substrate region divided by the surface fraction of aluminum in the bottom half of the substrate region is smaller than or equal to 5.5 and the surface fraction of aluminum on the substrate region of the cut edge surface of the precoated steel sheet directly resulting from the laser cutting operation is greater than or equal to 11%,
  in order to obtain the corrosion-improved zone, the laser cutting is performed using a laser cutting linear energy E comprised between 0.18 kJ/cm and 0.24 kJ/cm and an assist gas pressure comprised between $P_{min}$=200× E−34 bars and $P_{max}$=14 bars,
  the corrosion-improved zone forms a first section of the cut edge surface extending over only a fraction of the length of the cut edge surface and the laser cutting is further carried out such that, in a second section of the cut edge surface, extending over the entire height of the cut edge surface and over only a fraction of the length of the cut edge surface, the surface fraction of aluminum on the substrate region directly resulting from the laser cutting operation is comprised between 0.3% and 6%,
  in order to obtain the second section of the cut edge surface, laser cutting is performed over the second section using a laser cutting linear energy greater than or equal to 0.6 kJ/cm, more particularly greater than or equal to 0.8 kJ/cm, more particularly greater than or equal to 1.0 kJ/cm and even more particularly greater than or equal to 1.2 kJ/cm; and the pressure of the assist gas is comprised between 2 and 18 bars;

the thickness of the precoated steel sheet is comprised between 1.0 mm and 1.8 mm, and more particularly between 1.0 mm and 1.5 mm.

A method for manufacturing a welded blank is also provided comprising the steps of:

producing a first and a second precoated steel sheet, at least one among the first and the second precoated steel sheets being produced using the method as described above, and butt welding the first and the second steel precoated steel sheets so as to create a weld joint between said precoated steel sheets and thus obtain a welded blank, whereby the butt welding step includes a step of arranging the first and second precoated steel sheets in such a manner that the second section of at least one of the precoated steel sheets faces an edge, and preferably a second section, of the other precoated steel sheet.

According to particular embodiments, the method for manufacturing a welded blank may comprise one or more of the following features, taken alone or according to any possible combination:

the welding is a laser welding operation, the method further comprises, prior to the butt welding step, a step of removing, for each of the first and second steel sheets, the metallic alloy layer in a removal zone adjacent to the second section of the respective precoated steel sheet and wherein, during the butt welding step, the precoated steel sheets are welded at their edges where the metallic alloy layer has been removed, the removal of the metallic alloy layer is performed using a laser beam, during the removal step, the intermetallic alloy layer is left in the removal zone over at least a portion of its height, the welding is performed using a filler wire or a powder addition, and the filler wire or powder contains austenite-forming alloying elements.

A method for manufacturing a press-hardened steel part is also provided comprising the successive steps of:

carrying out the method as described above in order to obtain a welded blank, heating the welded blank so as to obtain an at least partly austenitic structure in the precoated steel sheets constituting the welded blank, hot forming the welded blank in a press so as to obtain a press-formed steel part, and cooling the steel part in the press so as to obtain a press-hardened steel part.

According to a particular embodiment, the cooling rate is equal to or greater than the critical martensitic or bainitic cooling rate of the steel sheets.

A precoated steel sheet is also provided comprising:

a steel substrate portion carrying, on at least one of its faces, a precoating portion, the precoating portion including an intermetallic alloy layer portion and a metallic alloy layer portion extending atop the intermetallic alloy layer portion, the metallic alloy layer portion being a layer of aluminum, a layer of aluminum alloy or a layer of aluminum-based alloy, the thickness of the precoated steel sheet being comprised between 0.8 mm and 5 mm, and at least one laser cut edge surface, the laser cut edge surface comprising a substrate portion and at least one precoating portion, wherein the precoated steel sheet comprises, on the laser cut edge surface, a plurality of solidification striations, wherein the laser cut edge surface comprises a corrosion-improved zone, extending over the entire height of the laser cut edge surface and over a length smaller than or equal to the length of the laser cut edge surface, and wherein the surface fraction of aluminum on the substrate region of the corrosion-improved zone 19 is greater than or equal to 9% and the surface fraction of aluminum on the bottom half of the substrate region of the corrosion-improved zone is greater than or equal to 0.5%.

According to particular embodiments of the precoated steel sheet:

the surface fraction of aluminum on the substrate region of the corrosion-improved zone is comprised between 9% and 70%, the surface fraction of aluminum on the bottom half of the substrate region of the corrosion-improved zone is greater than or equal to 1.5%, the ratio of the surface fraction of aluminum on the substrate region of the corrosion-improved zone divided by the surface fraction of aluminum in the bottom half of the substrate region of the corrosion-improved zone is smaller than or equal to 5.5 and the surface fraction of aluminum on the substrate region of the corrosion-improved zone is greater than or equal to 11%, the corrosion-improved zone extends over the entire length of the laser cut edge surface, the length of the corrosion-improved zone is strictly smaller than the total length of the laser cut edge surface and the laser cut edge surface further comprises a second section extending over the entire height of the laser cut edge surface and over only a fraction of the length of the laser cut edge surface, and wherein the surface fraction of aluminum on the substrate region of the second section is comprised between 0.3% and 6%, the thickness of the precoated steel sheet is comprised between 1.0 mm and 1.8 mm, and more particularly between 1.0 mm and 1.5 mm.

BRIEF DESCRIPTION OF THE DRAWINGS

The invention will be better understood upon reading the following specification, given only by way of example and with reference to the appended drawings, wherein.

DETAILED DESCRIPTION

The present disclosure relates to a method for producing a precoated steel sheet 1.

Figure 1:
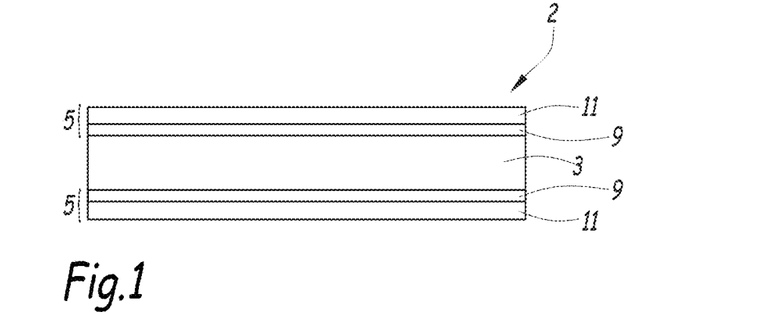
FIG. 1 is a cross-sectional view of a precoated steel strip, taken perpendicular to the longitudinal direction of the strip.

The method comprises a first step of providing a precoated steel strip 2, as shown in cross-section in FIG. 1.

As shown in FIG. 1, the precoated steel strip 2 comprises a metallic substrate 3 having, on at least one of its faces, a precoating 5. The precoating 5 is superimposed on the substrate 3 and in contact therewith.

The metallic substrate 3 is more particularly a steel substrate.

The steel of the substrate 3 is more particularly a steel having a ferrito-perlitic microstructure.

The substrate 3 is advantageously made of a steel intended for thermal treatment, more particularly a press-hardenable steel, and for example a manganese-boron steel, such as a 22MnB5 type steel.

According to one embodiment, the steel of the substrate 3 comprises, by weight:

0.10%≤C≤0.5%
0.5%≤Mn≤3%
0.1%≤Si≤1%
0.01%≤Cr≤1%
Ti≤0.2%
Al≤0.1%
S≤0.05%
P≤0.1%
B≤0.010% the rest being iron and impurities resulting from manufacturing.

More particularly, the steel of the substrate 3 comprises, by weight:

0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005% the rest being iron and impurities resulting from manufacturing.

According to an alternative, the steel of the substrate 3 comprises, by weight:

0.040%≤C≤0.100%
0.80%≤Mn≤2.00%
Si≤0.30%
S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.100%
Mo≤0.100%
Ca≤0.006%, the rest being iron and impurities resulting from manufacturing.

According to an alternative, the steel of the substrate 3 comprises, by weight:

0.24%≤C≤0.38%
0.40%≤Mn≤3%
0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025% wherein the titanium and nitrogen contents satisfy the following relationship:

$$Ti/N > 3.42,$$

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

0.05%≤Mo≤0.65%
0.001%≤W≤0.30%%
0.0005%≤Ca≤0.005% the rest being iron and impurities inevitably resulting from manufacturing.

The substrate 3 may be obtained, depending on its desired thickness, by hot rolling and/or by cold-rolling followed by annealing, or by any other appropriate method.

The substrate 3 advantageously has a thickness comprised between 0.8 mm and 5 mm, more particularly comprised between 1.0 mm and 2.5 mm, even more particularly between 1.2 mm and 2.5 mm or even between 1.0 mm and 2.0 mm.

According to a more particular example, the substrate 3 has a thickness comprised between 1.0 mm and 1.8 mm, and more particularly between 1.0 mm and 1.5 mm.

The precoating 5 is obtained by hot-dip coating, i.e. by immersion of the substrate 3 into a bath of molten metal. It comprises an intermetallic alloy layer 9 in contact with the substrate 3 and a metallic alloy layer 11 extending atop the intermetallic alloy layer 9.

The intermetallic alloy layer 9 is created by reaction between the substrate 3 and the molten metal of the bath. It comprises an intermetallic compound comprising at least one element from the metallic alloy layer 11 and at least one element from the substrate 3.

The thickness of the intermetallic alloy layer 9 is generally of the order of a few micrometers. In particular, its mean thickness is typically comprised between 2 and 7 micrometers.

The metallic alloy layer 11 has a composition which is close to that of the molten metal in the bath. It is formed by the molten metal carried away by the strip as it travels through the molten metal bath during hot-dip coating.

The metallic alloy layer 11 has, for example, a thickness comprised between 19 µm and 33 µm or between 10 µm and 20 µm.

The metallic alloy layer 11 is a layer of aluminum, or a layer of aluminum alloy or a layer of aluminum-based alloy.

In this context, an aluminum alloy refers to an alloy comprising more than 50% by weight of aluminum. An aluminum-based alloy is an alloy in which aluminum is the main element, by weight.

The intermetallic alloy layer 9 comprises intermetallic compounds of the $Fe_x$—$Al_y$ type, and more particularly $Fe_2Al_5$.

The particular structure of the precoating 5 obtained by hot-dip coating is in particular disclosed in patent EP 2 007 545.

According to one embodiment, the metallic alloy layer 11 is a layer of aluminum alloy further comprising silicon.

According to one example, the metallic alloy layer 11 comprises, by weight:

8%≤Si≤11%,
2%≤Fe≤4%, the rest being aluminum and possible impurities.

Advantageously, and as illustrated in FIG. 1, the substrate 3 is provided with a precoating 5 as described above on both of its faces.

The method for producing the precoated steel sheet 1 further comprises a step of cutting said precoated steel strip 2 so as to obtain at least one precoated steel sheet 1. The cutting is performed through laser cutting.

The thickness of the precoated steel sheet 1 is identical to that of the precoated steel strip 2. It is comprised between 0.8 mm and 5 mm, more particularly comprised between 1.0 mm and 2.5 mm, even more particularly between 1.2 mm and 2.5 mm, and even between 1.0 mm and 2.0 mm. According to a more particular example, the thickness of the precoated steel sheet 1 is comprised between 1.0 mm and 1.8 mm, and more particularly between 1.0 mm and 1.5 mm.

Figure 2:
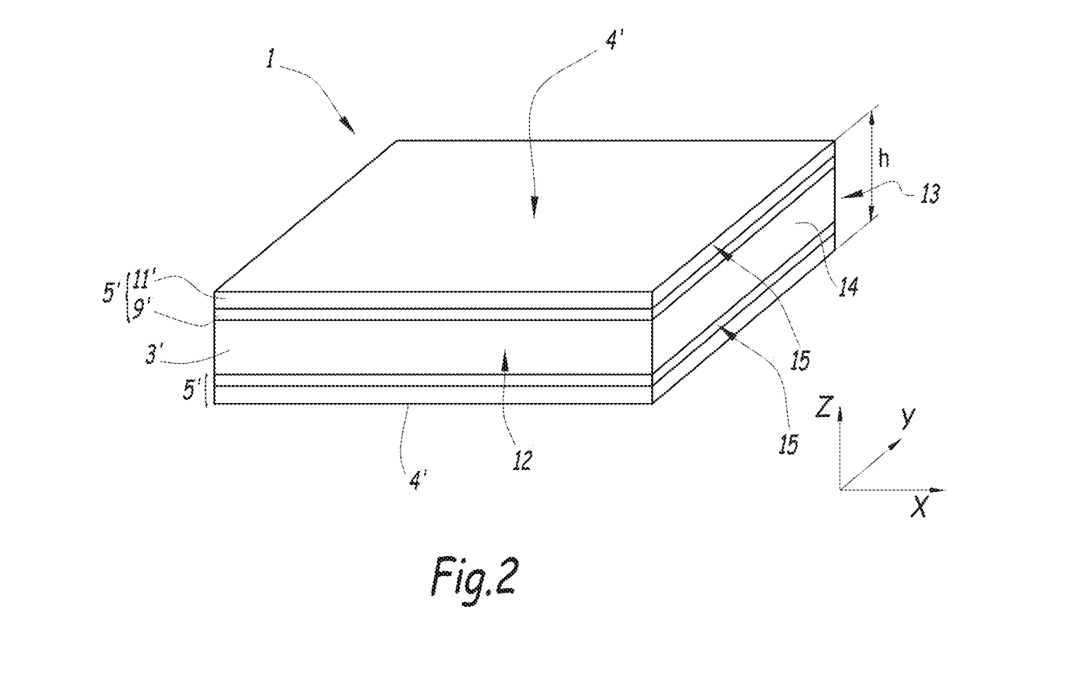
FIG. 2 is a perspective view of a precoated steel sheet.

FIG. 2 is a perspective schematic drawing of such a precoated steel sheet 1.

The precoated steel sheet 1 comprises a substrate portion 3' and at least one precoating portion 5', the precoating portion 5' including an intermetallic alloy layer portion 9' and a metallic alloy layer portion 11'.

The precoated steel sheet 1 further comprises two main opposite faces 4' and a peripheral edge 12 extending between the faces 4' around the periphery of the sheet 1. The length of the peripheral edge 12 is equal to the perimeter of the sheet 1. The height h of the peripheral edge 12 is equal to the thickness of the sheet 1.

In the context of this patent application, the height of an element is the dimension of this element taken along the direction of the thickness of the precoated sheet 1 (z direction in the figures).

The peripheral edge 12 extends substantially perpendicular to the faces 4'. In this context, "substantially" means that the peripheral edge 12 extends at an angle comprised between 65° and 90° relative to one of the faces 4'. The angle of the peripheral edge 12 relative to the faces 4' may vary along the periphery of the sheet 1.

In the example shown in FIG. 2, the peripheral edge 12 has a substantially rectangular contour, comprising four rectilinear sides. However, any other contour may be used, depending on the application.

The peripheral edge 12 comprises a cut edge surface 13, resulting from laser cutting.

During the laser cutting step, a laser beam of a laser cutting device impacts the steel strip 2 along a predetermined path so as to create the cut edge surface 13. The predetermined path extends in the plane of a face 4' of the sheet 1.

The cut edge surface 13 extends between the faces 4' of the precoated steel sheet 1 from one face 4' to the other. It extends over the entire height h of the peripheral edge 12.

The cut edge surface 13 may include at least one substantially planar portion.

Advantageously, the precoated steel sheet 1 is obtained through cutting along its entire contour. In this case, the peripheral edge 12 consists of the cut edge surface 13. The cut edge surface 13 thus extends around the entire periphery of the sheet 1.

According to an alternative, the cut edge surface 13 extends only over a fraction of the length of the peripheral edge 12. In this case, the rest of the peripheral edge 12 may coincide with the original lateral edges of the strip 2.

In the context of this patent application, the length of an element is the dimension of this element in the plane of a given face 4' of the precoated steel sheet 1. The length of the cut edge surface 13 therefore in particular corresponds to the dimension of the cut edge surface 13 along the path of the laser beam during laser cutting.

Figure 3:
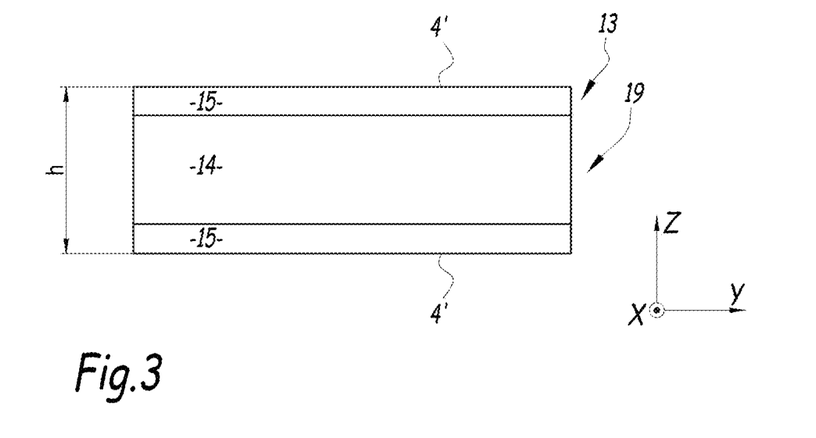
FIG. 3 is a schematic side view of the precoated steel sheet of FIG. 2.

As can be seen in FIGS. 2 and 3, the cut edge surface 13 comprises a substrate region 14 and at least one precoating region 15. The substrate region 14 corresponds to the surface of the substrate 3' located at the cut edge surface 13. It consists essentially of the material of the substrate 3. The precoating region 15 corresponds to the surface of the precoating 5' located at the cut edge surface 13. It consists essentially of the material of the precoating 5.

As shown in FIG. 3, the cut edge surface 13 comprises a corrosion-improved zone 19 extending over the entire height of the cut edge surface 13 and over a length that is smaller than or equal to the total length of the cut edge surface 13.

The corrosion-improved zone 19 results directly from the laser cutting operation.

Advantageously, the corrosion-improved zone 19 extends over a length equal to at least 3 mm, and more particularly over at least 10 mm.

According to one embodiment, the corrosion-improved zone 19 of the cut edge surface 13 extends over the entire length of the cut edge surface 13. In other words, it extends over the entire path of displacement of the laser beam during laser cutting.

According to another embodiment, the corrosion-improved zone 19 of the cut edge surface 13 extends over only a fraction of the length of the cut edge surface 13.

In the embodiment shown in FIG. 2, in which the precoated steel sheet 1 has a rectangular contour, the cut edge surface 13 may extend over one or more of the sides of the rectangle. The corrosion-improved zone 19 may extend over at least one of the sides of the rectangle.

Advantageously, the cut edge surface 13 may extend over the entire periphery of the rectangular precoated steel sheet 1 and the corrosion improved zone 19 may extend over one, two, three or four sides of the rectangle, preferably three or four sides thereof.

During the laser cutting step, the laser cutting is carried out in such a way that two features are present in the corrosion-improved zone 19:

(a) the total surface fraction $S_{Total}$ of aluminum on the substrate region 14 of the corrosion-improved zone 19 directly resulting from the laser cutting operation is greater than or equal to 9%, and more particularly greater than or equal to 9.0%; and (b) the surface fraction $S_{Bottom}$ of aluminum in the bottom half of the substrate region 14 of the corrosion-improved zone 19 directly resulting from the laser cutting operation is greater than or equal to 0.5%.

In this context, "directly resulting" in particular means that the fraction or ratio of aluminum is measured immediately after the laser beam of the laser cutting device has cut the precoated steel sheet 1 from the precoated steel strip 2, and in particular before any further step is carried out on the cut edge surface 13 of the precoated steel sheet 1, for example before a possible finishing step of the cut edge surface 13, such as brushing, machining, milling, sandblasting or stripping.

The total surface fraction $S_{Total}$ of aluminum on the substrate region 14 of the corrosion-improved zone 19 may be determined as follows:
- the substrate region 14 of the corrosion-improved zone 19 is imaged using scanning electron microscopy;
- the information obtained from the scanning electron microscopy is processed to obtain an EDS (Energy Dispersive X-Ray Spectroscopy) image showing, among all alloying elements, only the aluminum present on the considered substrate region 14. For example, the image is treated in such a manner that the aluminum traces present on the considered substrate region 14 appear in a color, such as red, strongly contrasting with a black background. As a result of the laser displacement during cutting, aluminum appears as inclined dripping traces.

Figure 4:
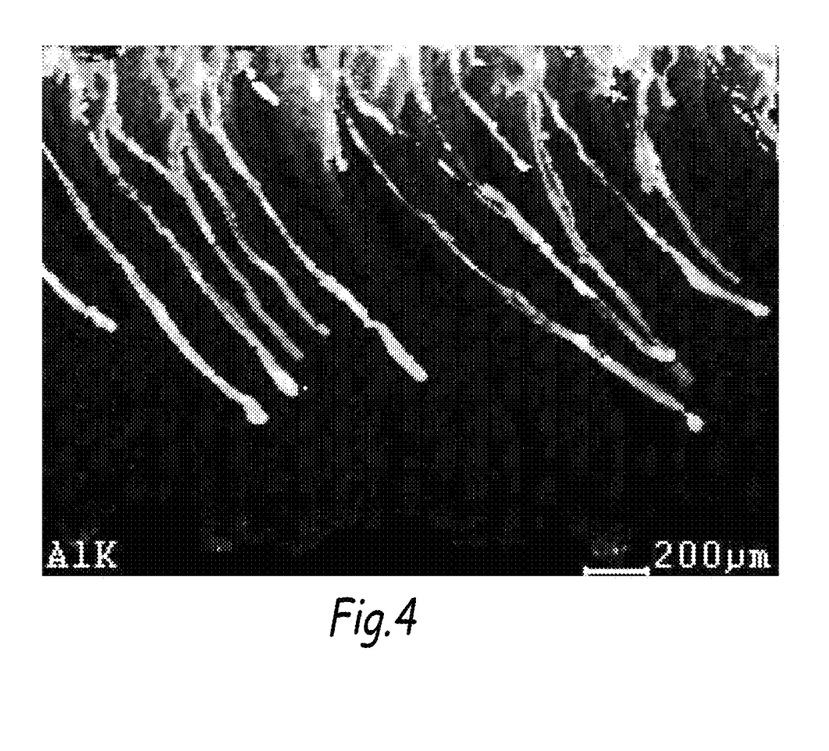
FIG. 4 is an image of the cut edge surface, showing, in white, the aluminum traces present on the substrate region resulting from the laser cutting operation.

An example of such an EDS image is shown in FIG. 4. In this black and white picture, the aluminum traces, which might otherwise appear in red, appear in white on a black background.
- the thus obtained EDS image is then processed through image processing in order to determine the surface fraction of aluminum in the image.

For this purpose, the number N of pixels corresponding to aluminum in the EDS image of the considered substrate region 14 is measured using image processing.

The number N of pixels corresponding to aluminum may be determined as follows. For each pixel in the EDS image, a threshold is set on the value of the red RGB parameter so as to determine whether this pixel is to be considered as red, i.e. as an aluminum pixel, or not. In particular, the threshold T is set to $$T = \frac{255}{3},$$

such that, if the value of the red RGB parameter of a pixel is greater than the threshold T, this pixel will be considered to be a red pixel for the purposes of this analysis.

For example, this image processing may be performed through a conventional image treatment analysis software known per se, such as for example the Gimp image analysis software.

The total surface fraction $S_{Total}$ of aluminum in the substrate region 14 of the corrosion-improved zone 19 is then obtained by dividing the number N of thus measured aluminum pixels, i.e. for example red pixels, by the total number of pixels in the image of the considered substrate region 14.

The same method is used for determining the surface fraction $S_{Bottom}$ of aluminum in the bottom half of the substrate region 14 of the corrosion-improved zone 19, but based on the analysis of an image of the bottom half of the substrate region 14 of the corrosion-improved zone 19 of the cut edge surface 13.

The inventors of the present invention have found out that when the laser cutting is carried out in such a way that features (a) and (b) mentioned above are obtained in a zone of the cut edge surface 13, this zone has an improved corrosion resistance as compared to mechanical cutting or laser cutting performed with usual laser cutting parameters for aluminum-coated steel blanks. Furthermore, this improved corrosion resistance is obtained at relatively low cost, since it is obtained directly through the laser cutting operation itself, rather than through additional surface treatment steps.

Advantageously, in the corrosion-improved zone 19, the total surface fraction $S_{Total}$ of aluminum on the substrate region 14 of the corrosion-improved zone 19 directly resulting from the laser cutting operation is comprised between 9%, more particularly 9.0%, and 70%. Indeed, an aluminum surface fraction comprised within this range allows for a cost effective and efficient corrosion protection of the zone 19 of the cut edge surface 13.

According to a first embodiment of the method according to the invention, the laser cutting is performed using a $CO_2$ laser with an inert gas as an assist gas. The inert gas is, for example, nitrogen, helium, argon or mixtures of these gases such as nitrogen/argon, nitrogen/helium, argon/helium or nitrogen/helium/argon mixtures. It is particularly interesting to use nitrogen, argon or mixtures thereof as inert gases, since these gases are relatively inexpensive, in particular compared to helium. It is also interesting to use mixtures of nitrogen and/or argon with helium, since such mixtures are less expensive than pure helium.

The $CO_2$ laser is advantageously a continuous laser.

The $CO_2$ laser in particular has a power comprised between 2 kW and 7 kW, preferably between 4 kW and 6 kW.

Figure 5:
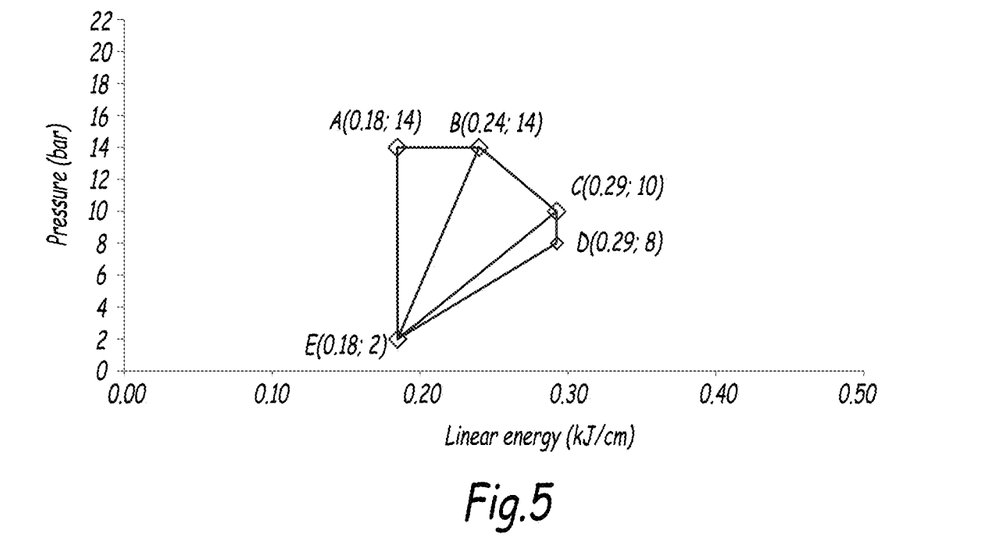
FIG. 5 is a graph showing laser cutting parameters according to a first embodiment of the invention, implementing a $CO_2$ Laser.

More particularly, during the cutting step, the corrosion-improved zone 19 of the cut edge surface 13 is obtained by using a laser cutting linear energy E and a pressure of the assist gas comprised within the boundaries defined by the polygon ABCDE in FIG. 5, the boundaries being included. More particularly, the laser cutting linear energy E is comprised between 0.18 kJ/cm and 0.29 kJ/cm and the pressure of the assist gas is comprised between $P_{min}=54.5\times E-7.8$ bars and $P_{max}$, whereby $P_{max}$ is equal to 14 bars for E≤0.24 kJ/cm and $P_{max}$ is equal to $-80\times E+33.2$ bars for E>0.24 kJ/cm.

The laser cutting linear energy corresponds to the amount of energy sent by the laser beam during laser cutting per unit length. It is calculated by dividing the power of the laser beam by the cutting speed.

Using these laser cutting parameters allows obtaining, in the zone of the cut edge 13 which has been obtained by laser cutting using these parameters, a total surface fraction $S_{Total}$ of aluminum on the substrate region 14 directly resulting from the laser cutting operation comprised between 9%, and in particular 9.0%, and 70% and a surface fraction $S_{Bottom}$ of aluminum in the bottom half of the substrate region 14 directly resulting from the laser cutting operation greater than or equal to 0.5%.

Advantageously, the laser cutting is carried out in such a way that, in the corrosion-improved zone 19:
(a) the total surface fraction $S_{Total}$ of aluminum on the substrate region 14 of the corrosion-improved zone 19 directly resulting from the laser cutting operation is greater than or equal to 9%, and more particularly greater than or equal to 9.0% and (b1) the surface fraction $S_{Bottom}$ of aluminum in the bottom half of the substrate region 14 of the corrosion-improved zone 19 directly resulting from the laser cutting operation is greater than or equal to 1.5%.

Indeed, the inventors have discovered that, when features (a) and (b1) are present in the corrosion-improved zone 19, an even better corrosion protection of the corrosion-improved zone 19 is obtained.

In order to obtain features (a) and (b1), during the laser cutting step, the corrosion-improved zone 19 is in particular obtained using a laser cutting linear energy E and a pressure of the assist gas comprised within the boundaries defined by the polygon ABCE in FIG. 5, the boundaries being included. More particularly, the laser cutting linear energy E is comprised between 0.18 kJ/cm and 0.29 kJ/cm and the pressure of the assist gas is comprised between $P_{min}$=72.7×E−11.1 bars and $P_{max}$, whereby $P_{max}$ is equal to 14 bars for E≤0.24 kJ/cm and $P_{max}$ is equal to −80×E+33.2 bars for E>0.24 kJ/cm.

Even more advantageously, the laser cutting is carried out in such a way that, in the corrosion-improved zone 19:

(a1) the total surface fraction $S_{Total}$ of aluminum on the substrate region 14 of the corrosion-improved zone 19 directly resulting from the laser cutting operation is greater than or equal to 11%, (b1) the surface fraction $S_{Bottom}$ of aluminum in the bottom half of the substrate region 14 of the corrosion-improved zone 19 directly resulting from the laser cutting operation is greater than or equal to 1.5%, and (c) the ratio R between $S_{Total}$ and $S_{Bottom}$ $$\left( R = \frac{S_{Total}}{S_{Bottom}} \right)$$

is smaller than or equal to 5.5.

Indeed, the inventors have found that, when the features (a1), (b1) and (c) are present in combination, the corrosion resistance of the corrosion-improved zone 19 is even better than when only features (a) and (b1) are present. In particular, the protection against corrosion is more homogenous due to the more homogenous distribution of the aluminum across the corrosion-improved zone 19.

In order to obtain a corrosion-improved zone 19 having the combination of features (a1), (b1) and (c1), laser cutting may be carried out over the corrosion-improved zone 19 using a laser cutting linear energy E and a pressure of the assist gas comprised within the boundaries defined by the triangle ABE in FIG. 5, the boundaries being included. More particularly, the laser cutting linear energy E is comprised between 0.18 kJ/cm and 0.24 kJ/cm and the pressure of the assist gas is comprised between $P_{min}$=200×E−34 bars and $P_{max}$=14 bars.

The method according to a second embodiment differs from the method according to the first embodiment in that the laser cutting is carried out using a solid-state laser instead of a $CO_2$ laser. The solid state laser is advantageously a continuous laser.

The solid state laser is for example an Nd:YAG (neodymium-doped yttrium aluminium garnet) laser, a diode laser, a fiber laser or a disk laser.

The solid state laser in particular has a power comprised between 2 kW and 15 kW, preferably between 4 kW and 12 kW, more preferably between 4 kW and 10 kW and even preferably between 4 kW and 8 kW.

As in the first embodiment, the laser cutting is carried out using an inert gas as an assist gas. The inert gas is, for example, nitrogen, helium, argon or mixtures of these gases such as nitrogen/argon, nitrogen/helium, argon/helium or nitrogen/helium/argon mixtures.

Figure 6:
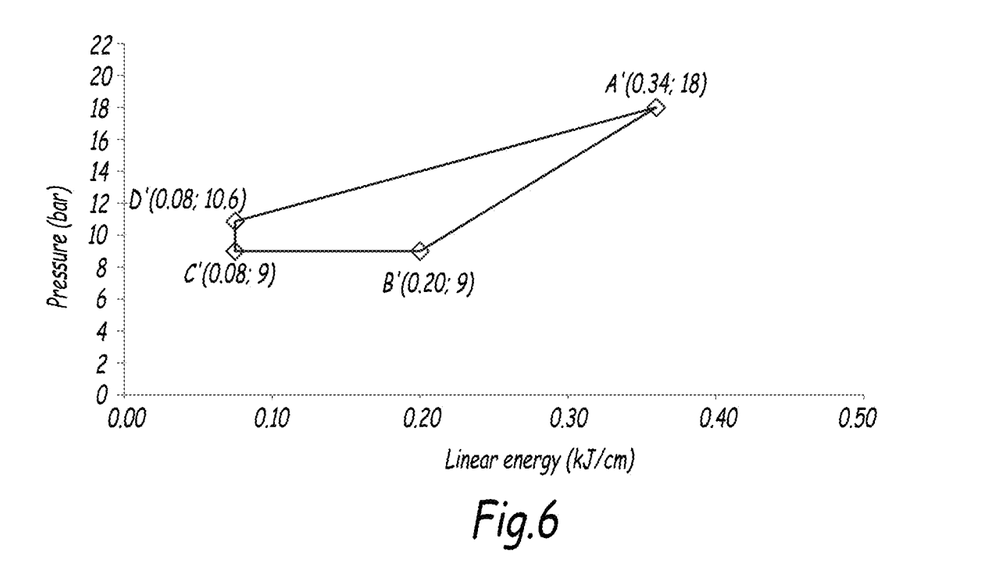
FIG. 6 is a graph showing laser cutting parameters according to a second embodiment of the invention, implementing a solid-state Laser.

In this embodiment, the corrosion-improved zone 19 of the cut edge surface 13 may be obtained by using a laser cutting linear energy E and a pressure of the assist gas comprised within the boundaries defined by the polygon A'B'C'D' in FIG. 6, the boundaries being included. More particularly, the laser cutting linear energy E is comprised 0.08 kJ/cm and 0.34 kJ/cm and the pressure of the assist gas is comprised between $P_{min}$ and $P_{max}$, whereby $P_{min}$=64.3×E−3.9 bars when E>0.2 kJ/cm and $P_{min}$=9 bars when E≤0.2 kJ/cm, and $P_{max}$ is equal to 28.6×E+8.3 bars.

Performing laser cutting within these parameters allows obtaining, in the zone of the cut edge 13 which has been obtained through cutting using these parameters, a total surface fraction $S_{Total}$ of aluminum on the substrate region 14 directly resulting from the laser cutting operation greater than or equal to 9%, and in particular greater than or equal to 9.0% (feature (a)), and more particularly comprised between 9%, more particularly 9.0%, and 70% and a surface fraction $S_{Bottom}$ of aluminum in the bottom half of the substrate region 14 directly resulting from the laser cutting operation greater than or equal to 0.5% (feature (b)), and even greater than or equal to 1.5% (feature (b1)).

As mentioned above, the inventors of the present invention have found out that, when the laser cutting is carried out in such a way that features (a) and (b) are respected in a given zone of the cut edge surface 13, an improved corrosion resistance of this zone can be obtained at relatively low cost. The corrosion resistance is even better when features (a) and (b1) are obtained.

In the embodiment in which the corrosion-improved zone 19 extends over the entire cut edge surface 13, the entire cut edge surface 13 is preferably obtained using the same laser cutting parameters.

The present disclosure also relates to a precoated steel sheet 1 having the features described above in relation to FIG. 2.

The use of laser cutting results in a particular geometry of the cut edge surface 13. Indeed, it results in a fusion of the material of the substrate 3 and of the precoating 5 at the cut edge surface 13, which then resolidifies creating solidification striations, also called solidification ripples, whose spacing depends, in particular, on the laser cutting speed, the nature and the pressure of the assist gas. Therefore, the precoated steel sheet 1 comprises, on the cut edge surface 13, a plurality of solidification striations or ripples.

Furthermore, the precoated steel sheet 1 comprises a heat affected zone at the cut edge surface 13. This heat affected zone results from the heating of the cut edge surface 13 during laser cutting. It may be observed through conventional means for detecting the presence of a heat affected zone, for example through micro- or nano-hardness measurements or through metallographic observations after adapted etching.

As mentioned above, the cut edge surface 13 of this precoated steel sheet 1 comprises a corrosion-improved zone 19, extending over the entire height h of the cut edge surface 13 and over a length smaller than or equal to the length of the cut edge surface 13, the total surface fraction $S_{Total}$ of aluminum on the substrate region 14 of the corrosion-improved zone 19 being greater than or equal to 9%, and more particularly 9.0%, and the surface fraction $S_{Bottom}$ of aluminum on the bottom half of the substrate region 14 of the corrosion-improved zone 19 being greater than or equal to 0.5%.

Preferably, the total surface fraction $S_{Total}$ of aluminum on the substrate region 14 of the corrosion-improved zone 19 is comprised between 9%, more particularly 9.0%, and 70%.

More preferably, the total surface fraction $S_{Total}$ of aluminum on the substrate region 14 of the corrosion-improved zone 19 is greater than or equal to 11%.

Advantageously, the surface fraction $S_{Bottom}$ of aluminum on the bottom half of the substrate region 14 of the corrosion-improved zone 19 is greater than or equal to 1.5%.

Even more preferably, the ratio R of the total surface fraction $S_{Total}$ of aluminum on the substrate region 14 of the corrosion-improved zone 19 divided by the surface fraction $S_{Bottom}$ of aluminum in the bottom half of the substrate region 14 of the corrosion-improved zone 19 is smaller than or equal to 5.5.

The method for obtaining a precoated steel sheet 1 according to a particular embodiment of the invention will now be described with reference to FIG. 7.

According to this particular embodiment, the corrosion-improved zone 19 of the cut edge surface 13 extends over only a fraction of the length of the cut edge surface 13 and forms a first section of the cut edge surface 13.

In this embodiment, the cut edge surface 13 comprises, in addition to the first section 19, a second section 20. The second section 20 extends over the entire height of the cut edge surface 13 and over a length strictly smaller than the length of the cut edge surface 13.

The second section 20 is for example adjacent to the first section 19 along the length of the cut edge surface 13.

Advantageously, the second section 20 extends over a length equal to at least 3 mm, and more particularly over at least 10 mm.

In particular, the second section 20 extends at an angle relative to the first section 19.

Preferably, the second section 20 is substantially planar. The second section 20 may for example constitute a weld edge intended for welding the sheet 1 to another sheet, i.e. a zone of the peripheral edge 12 where the precoated steel sheet 1 is intended to be welded to another steel sheet. In this case, the second section 20 is intended to be incorporated in the weld joint.

According to one example, the cut edge surface 13 consists of the first section 19 and the second section 20.

Figure 7:
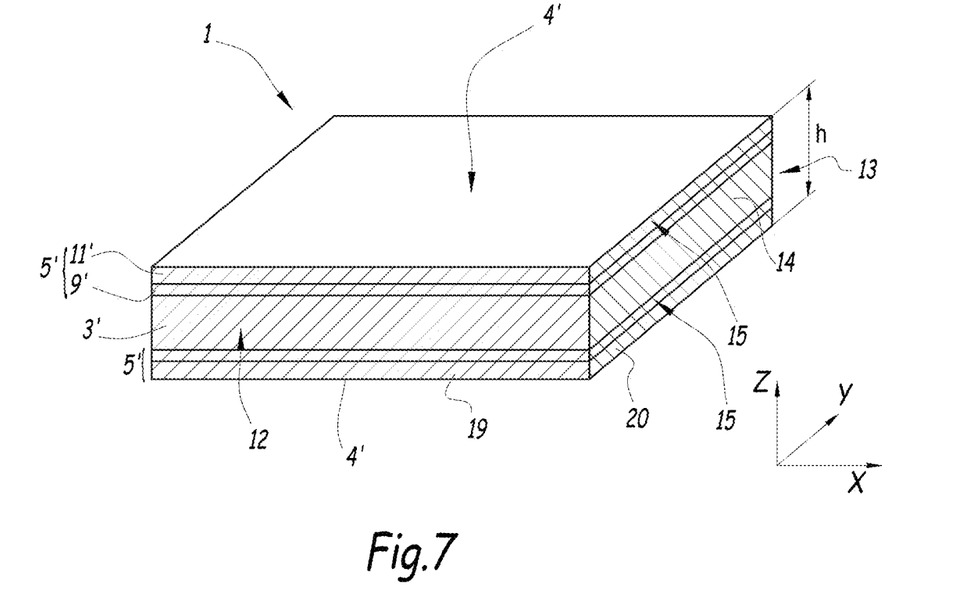
FIG. 7 is a schematic perspective view of a precoated steel sheet according to a particular embodiment of the invention.

In the example shown in FIG. 7, the precoated steel sheet 1 has a rectangular contour. In this case, for example, the first section 19 may extend over three of the sides of the rectangle, while the second section 20 extends over the remaining fourth side of the rectangle. According to a variant, the first section 19 may extend over two of the sides of the rectangle, while the second section 20 extends over the remaining two sides of the rectangle. According to this variant, the first and second sections 19, 20 may alternate along the periphery of the sheet 1.

Preferably, the total surface fraction $S_{Total}$ of aluminum on the substrate region 14 of the second section 20 is comprised between 0.3% and 6%.

In this particular embodiment, the thickness of the precoated steel sheet 1 is preferably comprised between 1.0 mm and 5.0 mm, more preferably between 1.0 mm and 2.5 mm, even more preferably between 1.2 mm and 2.5 mm.

In the method according to this particular embodiment, the second section 20 may in particular be obtained through laser cutting using different laser cutting parameters than the first section 19.

More particularly, during the laser cutting step, over the second section 20, the laser cutting is carried out in such a way that the total surface fraction $S_{Total}$ of aluminum on the substrate region 14 of the second section 20 directly resulting from the laser cutting operation is comprised between 0.3% and 6%.

In order to obtain a second section 20 having these properties, the laser cutting step may be carried out, over the second section 20, using a laser cutting linear energy greater than or equal to 0.6 kJ/cm and an inert gas as an assist gas.

Indeed, the inventors found that, when a section of the cut edge surface 13 is produced using these laser cutting parameters, the total surface fraction $S_{Total}$ of aluminum on the substrate region 14 of this section of the cut edge surface 13 is comprised between 0.3% and 6%.

Advantageously, the laser cutting linear energy used for obtaining the second section 20 is greater than or equal to 0.8 kJ/cm, more particularly greater than or equal to 1.0 kJ/cm and even more particularly greater than or equal to 1.2 kJ/cm. In particular, the inventors of the present invention have observed that even better results in terms of reduction of the surface fraction of aluminum in the second section 20 can be obtained with increasing linear energy.

Preferably, the pressure of the assist gas is comprised between 2 bars and 18 bars, more preferably between 6 bars and 18 bars, and even more preferably between 10 bars and 18 bars.

For example, for obtaining the second section 20, laser cutting is carried out over the second section 20 using a laser cutting linear energy greater than or equal to 0.8 kJ/cm and an assist gas pressure comprised between 2 bars and 18 bars.

According to another example, for obtaining the second section 20, laser cutting is carried out over the second section 20 using a laser cutting linear energy greater than or equal to 1.0 kJ/cm and an assist gas pressure comprised between 2 bars and 18 bars.

According to a further example, for obtaining the second section 20, laser cutting is carried out over the second section 20 using a laser cutting linear energy greater than or equal to 1.0 kJ/cm and an assist gas pressure comprised between 10 bars and 18 bars.

Preferably, the type of inert gas and the type and power of the laser used for obtaining the second section 20 of the cut edge surface 13 are the same as for the first section 19.

Preferably, only the cutting speed, i.e. the relative displacement speed of the laser beam relative to the strip 2, is changed between the first section 19 and the second section 20, the second section 20 being obtained using a cutting speed that is strictly smaller than that used for obtaining the first section 19.

For example, for a same laser beam, i.e. in particular for a same laser type and power, a higher cutting speed may be used for obtaining the first section 19 than for obtaining the second section 20. In this manner, the laser cutting linear energy will be lower in the first section 19 than in the second section 20.

Such an adjustment of the laser cutting parameters during the cutting step may be carried out automatically by the laser cutting device. It may also be carried out manually by an operator.

For example, the laser cutting step is carried out using a continuous 4 kW $CO_2$ laser with nitrogen as an assist gas, using an assist gas pressure equal to 14 bars. The first section 19 is for example obtained using a cutting speed equal to 10 m/min, while the second section 20 is for example obtained using a cutting speed equal to 2 m/min.

According to another example, the laser cutting step is carried out using a 4 kW diode laser with nitrogen as an assist gas, using an assist gas pressure equal to 10 bars. The first section 19 is for example obtained using a cutting speed equal to 20 m/min, while the second section 20 is for example obtained using a cutting speed equal to 2 m/min.

Optionally, according to this embodiment, the method for manufacturing a precoated steel sheet 1 comprises a step of brushing the second section 20 of the cut edge surface 13, for example directly after performing the laser cutting. Such a brushing step further reduces the aluminum fraction in the second section of the cut edge surface 13. The inventors of the present invention have observed that, due to the high adhesion to the substrate 3' of the precoated steel sheet 1 of the aluminum which may have poured onto the cut edge surface 13 during laser cutting, only very limited amounts of aluminum may be removed through brushing of the cut edge surface 13.

The present disclosure also relates to a method for manufacturing a welded blank, comprising the steps of:
- producing a first and a second precoated steel sheet 1, at least one among the first and the second precoated steel sheet 1, and preferably the first and the second precoated steel sheets 1, being produced using the method according to the particular embodiment as disclosed above with reference to FIG. 7;
- butt welding the first and the second precoated steel sheets 1 in order to create a weld joint between said precoated steel sheets 1 and thus obtain a welded blank.

The butt welding step includes a step of arranging the first and second precoated steel sheets 1 in such a manner that the second section 20 of at least one of the precoated sheets 1 faces an edge, and preferably a second section 20, of the other sheet 1.

The weld joint between said first and second precoated steel sheets 1 is obtained from the melting of their facing edges, and in particular between two second sections 20 thereof.

The welding is advantageously a laser welding.

The welding may be an autogenous welding, i.e. without adding a filler material, for example in the form of a wire or powder.

According to an alternative, the welding is carried out using an adequate filler material, in particular a filler wire or powder. The filler wire or powder in particular includes austenite-forming elements so as to balance the ferrite-forming and/or the intermetallic compound forming effect of the aluminum from the precoating 5'.

Figure 8:
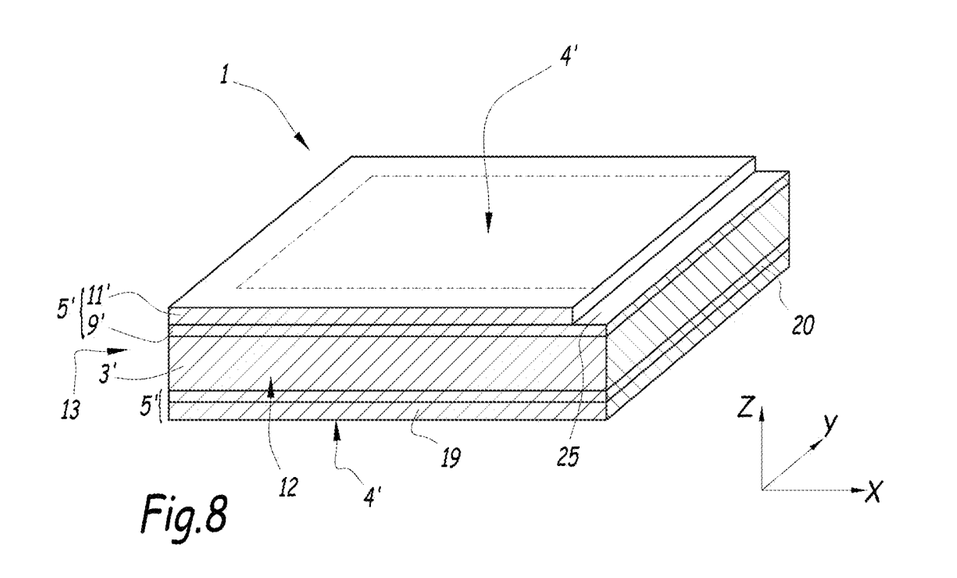
FIG. 8 is a schematic perspective view of a precoated steel sheet comprising a removal zone.

Advantageously, as shown in FIG. 8, prior to butt welding, for each of the precoated steel sheets 1, the metallic alloy layer 11' is removed on at least one face 4' of the precoated steel sheet 1 over a removal zone 25 that is adjacent to the second section 20 of the considered precoated steel sheet 1 and, during the butt welding step, the precoated steel sheets 1 are welded at the respective edges from which the metallic alloy layer 11' has been removed.

The removal zone 25 advantageously extends from the second section 20 over a portion of the considered face 4'.

The removal of the metallic alloy layer 11' is advantageously carried out through laser ablation as disclosed in prior application WO 2007/118939.

The width of the removal zone 25 on each of the steel sheets 1 is for example comprised between 0.2 and 2.2 mm.

Preferably, the removal step is carried out so as to remove only the metallic alloy layer 11' while leaving the intermetallic alloy layer 9'. Therefore, the intermetallic alloy layer 9' is left in the removal zone 25 over at least a portion of its height. In this case, the residual intermetallic alloy layer 9' protects the areas of the welded blank immediately adjacent to the weld joint from oxidation and decarburization during subsequent hot-forming steps, and from corrosion during the in-use service.

Optionally, the method for manufacturing a welded blank comprises a step of brushing the edge that is to be welded of at least one among the first and the second steel sheets 1, and preferably both the first and the second steel sheets 1, prior to carrying out the welding step.

If the method includes the removal of the metallic alloy layer 11' prior to welding, brushing is preferably carried out after this removal step. In this case, the brushing removes the aluminum traces that may have spattered, during the removal operation, onto the edge of the sheet 1 that is to be welded. Such a spattering may in particular occur when the removal is performed through laser ablation. Such spatter has a relatively low adherence to the edge and can therefore be removed relatively easily through brushing. Brushing may therefore further reduce the aluminum content in the weld joint.

The present disclosure also relates to a method for manufacturing a press-hardened steel part comprising the steps of:
- producing a welded blank using the method as disclosed above;
- heating the welded blank so as to obtain an at least partly austenitic structure in the steel sheets 1 constituting the welded blank;
- hot forming the welded blank in a press to obtain a steel part; and
- cooling the steel part in the press so as to obtain a press-hardened steel part.

More particularly, the welded blank is heated to a temperature that is greater than the upper austenite transformation temperature Ac3 of the steel sheets 1.

During the cooling step, the cooling rate is advantageously equal to or greater than the critical martensitic or bainitic cooling rate of the steel sheets 1.

The method and precoated steel sheet according to the particular embodiment are particularly advantageous in the case where the second section 20 is intended to constitute a weld edge for welding to another part.

Indeed, the inventors of the present invention have shown that, when the total surface fraction $S_{Total}$ of aluminum on the substrate region 14 of the weld edge is comprised between 0.3% and 6%, it is possible to obtain, after press-hardening, a weld joint having good hardness and mechanical strength properties, especially after removal of at least the metallic alloy layer 11' of the precoating 5 in a removal zone 25 adjacent to the weld edge prior to welding. In particular, the hardness and mechanical strength properties of a thus obtained weld are much better than those that can be obtained with a precoated steel sheet that has been obtained by laser cutting using conventional parameters even after brushing. Indeed, as has been explained above, due to the high adhesion to the substrate 3' of the precoated steel sheet 1 of the aluminum which may have poured onto the cut edge surface 13 during laser cutting, only very limited amounts of aluminum may be removed through brushing of the cut edge surface.

The precoated steel sheet 1 obtained using the method according to the particular embodiment is particularly well tailored to the desired application, since its weld edge properties allow obtaining a good weld joint, while the rest of the cut edge surface 13, corresponding to the first section 19, which is not intended to be welded to another part, has an improved corrosion resistance.

The method according to the particular embodiment is further particularly advantageous as regards the productivity increase.

Indeed, it allows selectively providing an improved corrosion protection to all the edges which are not intended to be weld edges, while at the same time providing improved properties to the weld edge in view of welding, through a significant reduction in the amount of aluminum present on the substrate region 14 of the weld edge, merely through an adequate control of the laser cutting parameters depending on the needs.

Obtaining a total surface fraction $S_{Total}$ of aluminum smaller than 0.3% on the substrate region 14 of the second section 20 would be too costly from an economic point of view.

Particularly satisfactory mechanical properties of the weld joint can be obtained if, prior to welding, the coating of the precoated steel sheets 1 is at least partially removed along the edges that are to be welded as has been described previously and/or when a filler wire or powder comprising austenite-forming elements is used. Such mechanical properties are particularly important if the parts are intended to form anti-intrusion parts, structural parts or parts that contribute to the safety of automotive vehicles.

Furthermore, such parts can be obtained with a high productivity, since no additional operations are needed in order to remove the traces of aluminum present on the weld edge prior to the welding operation or to protect the precoated steel sheets from corrosion during storage prior to welding and/or hot-forming.

The inventors of the present invention have carried out the following experiments.

Precoated steel sheets 1 having a thickness of 1.5 mm were cut from precoated steel strips 2 through laser cutting using pure nitrogen as an assist gas and using different laser cutting linear energies and assist gas pressures.

The precoated steel sheets 1 had a rectangular shape.

The precoated steel strips 2 were strips having the compositions and precoatings as disclosed above.

More particularly, the steel of the strip 2, comprised, in weight %:
C: 0.22%
Mn: 1.16%
Al: 0.03%
Si: 0.26%
Cr: 0.17%
B: 0.003%
Ti: 0.035%
S: 0.001%
N: 0.005% the rest being iron and possible impurities resulting from elaboration.

This steel is known under the commercial name Usibor 1500.

The precoating 5 has been obtained by hot-dip coating the steel strip 2 in a bath of molten metal.

The metallic alloy layer of the precoating 5 comprised, by weight:
Si: 9%
Fe: 3%, the rest consisting of aluminum and possible impurities resulting from elaboration.

The metallic alloy layer had an average total thickness of 20 μm.

The intermetallic alloy layer contained intermetallic compounds of the $Fe_x$-Aly type, and majoritarily $Fe_2Al_3$, $Fe_2Al_5$ and $Fe_xAl_ySi_z$. It had an average thickness of 5 μm.

In a first series of experiments, (samples S1 to S8), the laser cutting step was carried out using a $CO_2$ laser having a power of 4 kW.

For each of the thus obtained samples, the inventors measured the corresponding total surface fraction $S_{Total}$ of aluminum on the substrate region 14 of the cut edge surface 13 of the precoated steel sheet 1, the surface fraction $S_{Bottom}$ of aluminum on the bottom half of the substrate region 14 of the cut edge surface 13 of the precoated steel sheet 1, as well as the ratio R between $S_{Total}$ and $S_{Bottom}$.

The measurements were performed based on images of the cut edge surface 13 taken with a scanning electron microscope using the following parameters:
magnification: ×60
analysis length: 3 mm;
electron beam energy: between 15 and 25 keV.

The inventors then determined the corrosion resistance of the thus obtained samples S1 to S8 using the following method. The samples were maintained in a hermetically closed chamber under a humidity of 100% and a temperature of 70° C. for 280 hours. The samples were then analyzed visually to detect the presence of corrosion.

The corrosion resistance was graded as follows:
Grade "1" corresponds to samples for which no red rust formation was observed, corresponding to an excellent corrosion resistance,
Grade "2" corresponds to samples for which only small amounts of red rust were observed, corresponding to a good corrosion resistance, and
Grade "3" corresponds to cases where an unacceptable amount of red rust formation, corresponding to a strong corrosion and therefore to a poor corrosion resistance, was observed.

The below Table 1 summarizes, for each of the samples of the first series of experiments, the laser cutting parameters used to obtain the sample, as well as the resulting surface fractions $S_{Total}$ and $S_{Bottom}$ of aluminum on the substrate region 14 of the cut edge surface 13 of the precoated steel sheet 1, the ratio R between $S_{Total}$ and $S_{Bottom}$ and the corrosion resistance grade.

TABLE 1

| Sample reference | P (bars) | E (kJ/cm) | $S_{Total}$ (%) | $S_{Bottom}$ (%) | R | Grade |
|---|---|---|---|---|---|---|
| S1 | 14 | 0.18 | 11.3 | 2.1 | 5.38 | 1 |
| S2 | 14 | 0.24 | 11.1 | 11.5 | 0.96 | 1 |
| S3 | 10 | 0.29 | 10.8 | 1.8 | 6 | 1 |
| S4 | 8 | 0.29 | 11.1 | 0.5 | 22.2 | 2 |
| S5 | 2 | 0.18 | 20 | 14.8 | 1.35 | 1 |
| S6 | 5 | 0.29 | 11.1 | 0 | 11.1 | 3 |
| S7 | 5 | 0.48 | 20.7 | 0 | 20.7 | 3 |
| S8 | 10 | 0.33 | 6.1 | 0.8 | 7.6 | 3 |

In the above Table 1, the samples which are not according to embodiments of the invention are underlined.

The above results show that, for all the samples which are according to embodiments of the invention (samples S1 to S5), no corrosion, corresponding to an excellent corrosion resistance, or only a small amount of corrosion, corresponding to a good corrosion resistance, was observed.

On the contrary, for all the samples which are not according to embodiments of the invention (samples S6 to S8), an unacceptable amount of red rust formation, corresponding to a strong corrosion of the cut edge surface 13, was observed.

The inventors further carried out the following additional experiments.

Figure 9:
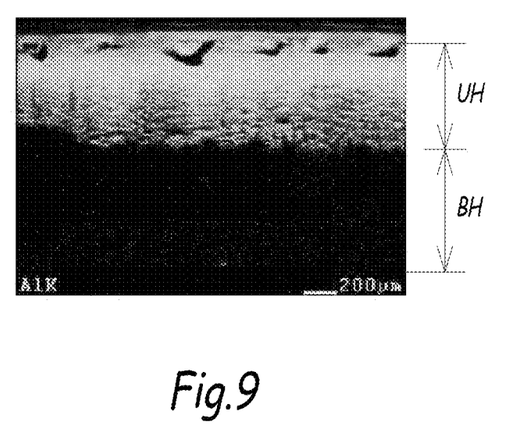
FIG. 9 is an image of the cut edge surface of a mechanical cut sample, obtained by scanning electron microscopy.

As a first comparative example, the inventors obtained a precoated steel sheet sample from the precoated steel strip 2 described above using shearing instead of laser cutting. An image, obtained by scanning electron microscopy, of the cut edge surface of such a mechanically cut sample is shown in FIG. 9. As can be seen in this image, samples obtained by shearing have a high surface fraction of aluminum on the upper half UH of the substrate region 14 of the cut edge surface 13, but do not have any aluminum in the bottom half BH.

A second comparative precoated steel sheet sample was obtained from the precoated steel strip 2 by shearing, followed by milling of the cut edge surface.

A third comparative precoated steel sheet sample was obtained from the precoated steel strip 2 through sawing, rather than laser cutting.

The corrosion resistance of these comparative samples was determined using the above-mentioned method.

For the three comparative examples mentioned above (obtained by shearing, shearing and milling or sawing), an unacceptable amount of red rust formation, corresponding to a strong corrosion of the cut edge surface, was observed.

These results confirm that the method according to embodiments of the invention results in an improved corrosion resistance, as compared to mechanical cutting, without requiring the implementation of additional steps in addition to the cutting itself. Therefore, the method for obtaining a precoated steel sheet 1 according to embodiments of the invention is particularly advantageous, since the cutting itself automatically results in the desired corrosion protection of the edges.

The results further show that the corrosion resistance is even further improved when the features (a) and (b1) are simultaneously present, since no red rust formation is observed in samples S1, S2, S3 and S5, whereas small amounts of red rust have been observed for sample S4.

The inventors have further observed that, when the features (a1), (b1) and (c) are simultaneously present, as is the case for samples S1, S2 and S5, the total amount of aluminum on the cut edge surface 13 is greater and the distribution of the aluminum across the cut edge surface 13 is further more homogenous, resulting in a greater homogeneity of the corrosion protection across the cut edge surface 13.

In a second series of experiments (samples S9 to S18), the inventors performed analogous experiments using a disk laser having a power of 4 kW for the laser cutting step, instead of a $CO_2$ laser.

The below Table 2 summarizes, for each of the samples S9 to S18 of the second series of experiments, the laser cutting parameters used to obtain the sample, as well as the resulting surface fractions $S_{Total}$ and $S_{Bottom}$ of aluminum on the substrate region 14 of the cut edge surface 13 of the precoated steel sheet and the corrosion resistance grade.

TABLE 2

| Sample reference | P (bars) | E (kJ/cm) | $S_{Total}$ (%) | $S_{Bottom}$ (%) | Grade |
|---|---|---|---|---|---|
| S9 | 18 | 0.34 | 9.4 | 2.9 | 1 |
| S10 | 9 | 0.20 | 9.3 | 1.5 | 1 |
| S11 | 9 | 0.08 | 21.7 | 5.2 | 1 |
| S12 | 14 | 0.20 | 12.8 | 8.9 | 1 |
| S13 | 14 | 0.24 | 15.8 | 5.1 | 1 |
| S14 | 9 | 0.14 | 13.8 | 1.9 | 1 |
| S15 | 14 | 0.08 | 9.6 | 0 | 3 |
| S16 | 14 | 0.34 | 8 | 1.5 | 3 |
| S17 | 8 | 0.34 | 8.7 | 2.2 | 3 |
| S18 | 6 | 0.08 | 14.9 | 0 | 3 |

TABLE 2-continued

In the above Table 2, the samples which are not according to embodiments of the invention are underlined.

These experiments confirm that, for all the samples according to embodiments of the invention (samples S9 to S14), no corrosion, corresponding to an excellent corrosion resistance, was observed (Grade 1).

On the contrary, for the samples which are not according to embodiments of the invention (samples S15 to S18), an unacceptable amount of red rust formation, corresponding to a strong corrosion of the cut edge surface 13, was observed (Grade 3).

The inventors further carried out the following third series of experiments relative to the particular embodiment of the invention.

Using a precoated steel strip 2 having the same properties as described above in relation with the first series of experiments, they produced precoated steel sheets 1 through laser cutting using a 4 kW $CO_2$ laser with pure nitrogen as an assist gas and using different laser cutting linear energies. The nitrogen pressure was comprised between 2 bars and 18 bars.

The obtained precoated steel sheets 1 had a rectangular shape.

For each laser cutting linear energy, the inventors measured the surface fraction of aluminum on the substrate region 14 of the cut edge surface 13.

Figure 10:
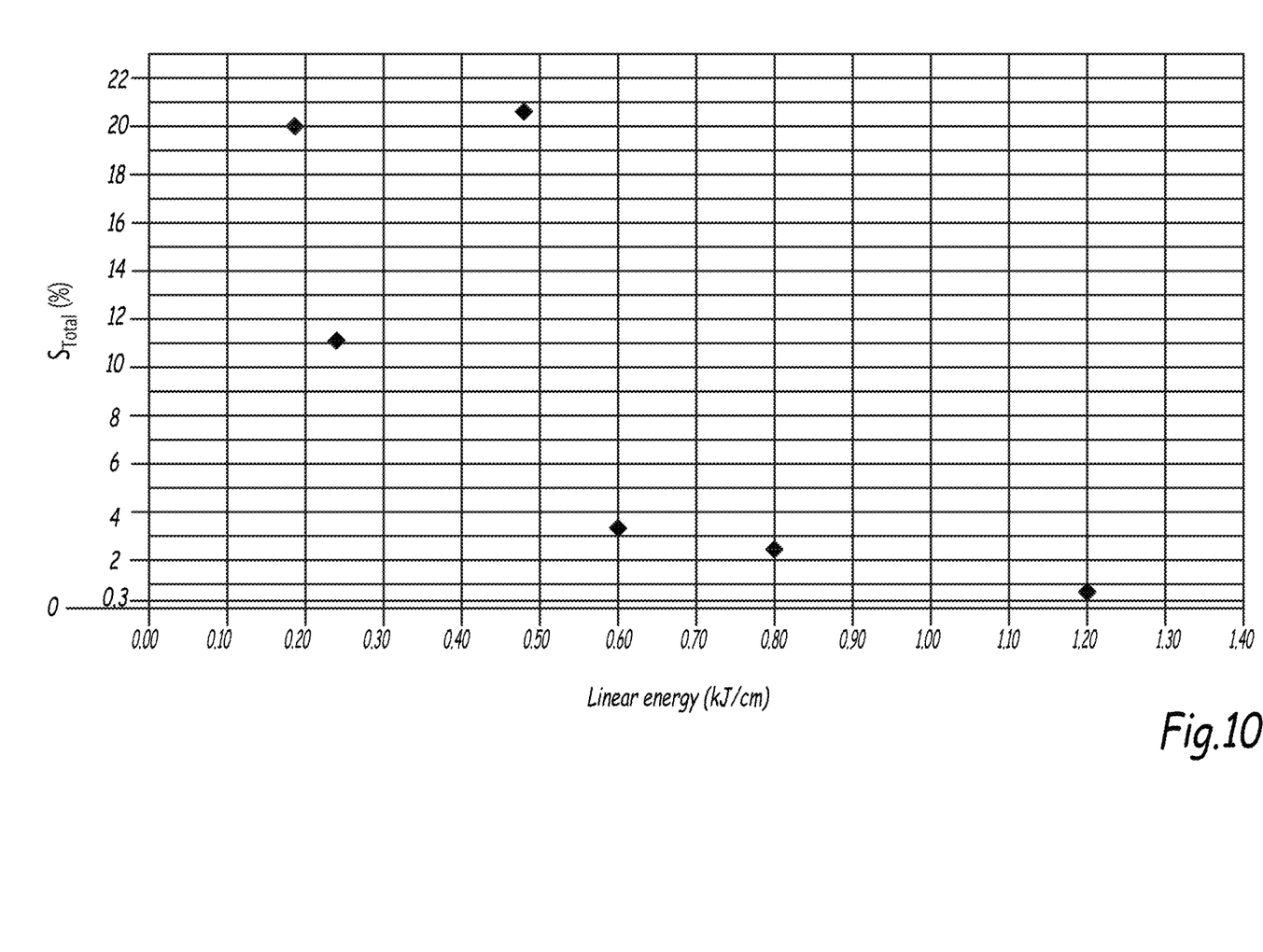
FIG. 10 is a graph showing the surface fraction of aluminum on the substrate region of a cut edge surface as a function of cutting linear energy.

FIG. 10 is a graph showing the total surface fraction $S_{Total}$ of aluminum on the substrate region 14 of the considered cut edge surface 13 of the precoated steel sheet 1 as a function of laser cutting linear energy.

As can be seen on FIG. 10, for a laser cutting linear energy strictly smaller than 0.6 kJ/cm, the surface fraction of aluminum on the substrate region 14 of the considered edge surface 13 resulting from the laser cutting is strictly greater than 6%.

On the contrary, for a laser cutting linear energy equal to or greater than 0.6 kJ/cm, the aluminum surface fraction on the cut edge surface 13 becomes smaller than or equal to about 6%. It is further greater than or equal to 0.3%.

For a linear cutting energy equal to 1.20 kJ/cm, the surface fraction of aluminum on the substrate region 14 of the cut edge surface 13 is even comprised between 0.3% and 4.5%.

Therefore, laser cutting the precoated steel strip 2 with laser cutting linear energies equal to or greater than 0.6 kJ/cm results in particularly low amounts of aluminum being deposited on the cut edge surface 13 due to the laser cutting operation.

The inventors have further observed that analogous results can be obtained when using other types of inert gas, and in particular argon.

The inventors further carried out experiments in which two precoated steel sheets 1 comprising a second section 20 having a total surface fraction $S_{Total}$ of aluminum comprised between 0.3% and 6% on its substrate region 14 according to the particular embodiment of the invention were butt-welded together through autogenous laser welding, i.e. without welding wire or powder, in order to create a welded blank and the thus obtained welded blank was hot-formed and press-hardened to obtain a press-hardened steel part.

Hardness measurements carried out on the weld joint of the thus obtained steel parts show that the weld joint has a hardness which is higher than the hardness which would be obtained when using precoated steel sheets which are not according to embodiments of the invention, and which, for example have been obtained through laser cutting with a smaller laser cutting linear energy.

The method according to the particular embodiment of the invention is therefore advantageous since no relative hardness drop is experienced in the weld.

What is claimed is:

1. A method for producing a precoated steel sheet comprising the successive steps of:
   providing a precoated steel strip comprising a steel substrate having, on at least one main face thereof, a precoating, the precoating comprising an intermetallic alloy layer and a metallic alloy layer extending atop the intermetallic alloy layer, the metallic alloy layer being a layer of aluminum, a layer of aluminum alloy or a layer of aluminum-based alloy;
   laser cutting the precoated steel strip so as to obtain at least one precoated steel sheet, the precoated steel sheet comprising a cut edge surface resulting from the cutting operation, the cut edge surface comprising a substrate region and a precoating region and a thickness of the precoated steel sheet being between 0.8 mm and 5 mm, the cut edge surface further comprising solidification striations,
   the laser cutting being carried out such that the laser cutting results directly in a corrosion-improved zone of the cut edge surface, extending over an entire height of the cut edge surface and over a length smaller than or equal to a length of the cut edge surface, a surface fraction of aluminum on the substrate region of the corrosion-improved zone of the cut edge surface directly resulting from the laser cutting operation being greater than or equal to 9% and a surface fraction of aluminum on a bottom half of the substrate region of the corrosion-improved zone of the cut edge surface directly resulting from the laser cutting operation being greater than or equal to 0.5%.

2. The method according to claim 1, wherein the laser cutting is carried out such that, in the corrosion-improved zone of the cut edge surface, the surface fraction of aluminum on the substrate region directly resulting from the laser cutting operation is between 9% and 70%.

3. The method according to claim 1, wherein the laser cutting step is performed using an inert gas as an assist gas.

4. The method according to claim 3, wherein the assist gas is chosen among argon, helium, nitrogen and mixtures of these gases.

5. The method according to claim 3, wherein the laser cutting step is performed using a $CO_2$ laser.

6. The method according to claim 5, wherein, in order to obtain the corrosion-improved zone, the laser cutting is performed using a laser cutting linear energy E between 0.18 kJ/cm and 0.29 kJ/cm and an assist gas pressure P between $P_{min}=54.5\times E-7.8$ bars and $P_{max}$, whereby $P_{max}$ is equal to 14 bars for E≤0.24 KJ/cm and $P_{max}$ is equal to $-80\times E+33.2$ bars for E>0.24 KJ/cm.

7. The method according to claim 1, wherein the laser cutting step is performed using a solid state laser.

8. The method according to claim 7, wherein the solid state laser is an Nd:YAG laser, a fiber laser, a disk laser or a diode laser.

9. The method according to claim 7, wherein, in order to obtain the corrosion-improved zone, the laser cutting is performed using a laser cutting linear energy E between 0.08 kJ/cm and 0.34 kJ/cm and an assist gas pressure P between $P_{min}$ and $P_{max}$, whereby $P_{min}=64.3\times E-3.9$ bars when E>0.2 KJ/cm and $P_{min}=9$ bars when E≤ 0.2 KJ/cm and $P_{max}$ is equal to $28.6\times E+8.3$ bars.

10. The method according to claim 1, wherein the laser cutting is carried out such that the surface fraction of aluminum directly resulting from the laser cutting operation on the bottom half of the substrate region of the cut edge surface is greater than or equal to 1.5%.

11. The method according to claim 10, wherein, in order to obtain the corrosion-improved zone, the laser cutting is performed using a $CO_2$ laser and using a laser cutting linear energy E between 0.18 kJ/cm and 0.29 kJ/cm and an assist gas pressure P between $P_{min}=72.7\times E-11.1$ bars and $P_{max}$, whereby $P_{max}$ is equal to 14 bars for E≤0.24 KJ/cm and $P_{max}$ is equal to $-80\times E+33.2$ bars for E>0.24 KJ/cm.

12. The method according to claim 10, wherein the laser cutting is further carried out such that, in the corrosion-improved zone, a ratio of the surface fraction of aluminum on the substrate region divided by the surface fraction of aluminum in the bottom half of the substrate region is smaller than or equal to 5.5 and the surface fraction of aluminum on the substrate region of the cut edge surface of the precoated steel sheet directly resulting from the laser cutting operation is greater than or equal to 11%.

13. The method according to claim 12, wherein, in order to obtain the corrosion-improved zone, the laser cutting is performed using a $CO_2$ laser and a laser cutting linear energy E between 0.18 kJ/cm and 0.24 kJ/cm and an assist gas pressure between $P_{min}=200\times E-34$ bars and $P_{max}=14$ bars.

14. The method according to claim 1, wherein the thickness of the precoated steel sheet is between 1.0 mm and 1.8 mm.

15. The method according to claim 14, wherein the thickness of the precoated steel sheet is between 1.0 and 1.5 mm.

16. The method according to claim 1, wherein the corrosion-improved zone forms a first section of the cut edge surface extending over only a fraction of the length of the cut edge surface and wherein the laser cutting is further carried out such that, in a second section of the cut edge surface, extending over the entire height of the cut edge surface and over only a fraction of the length of the cut edge surface, the surface fraction of aluminum on the substrate region directly resulting from the laser cutting operation is between 0.3% and 6%.

17. The method according to claim 16, wherein, in order to obtain the second section of the cut edge surface, laser cutting is performed over the second section using a laser cutting linear energy greater than or equal to 0.6 kJ/cm.

18. The method according to claim 17, wherein the pressure of the assist gas is between 2 and 18 bars.

19. A method for manufacturing a welded blank, comprising the steps of:
   producing a first and a second precoated steel sheet, at least one among the first and the second precoated steel sheets being produced using the method according to claim 16; and
   butt welding the first and the second steel precoated steel sheets so as to create a weld joint between the first and second precoated steel sheets and thus obtain a welded blank, the butt welding step including arranging the first and second precoated steel sheets in such a manner that the second section of at least one of the precoated steel sheets faces an edge.

20. The method according to claim 19, wherein the welding is a laser welding operation.

21. The method according to claim 19, further comprising, prior to the butt welding step, a step of removing, for each of the first and second steel sheets, the metallic alloy layer in a removal zone adjacent to the second section of the respective precoated steel sheet and wherein, during the butt welding step, the precoated steel sheets are welded at their edges where the metallic alloy layer has been removed.

22. The method according to claim 21, wherein the removing of the metallic alloy layer is performed using a laser beam.

23. The method according to claim 21, wherein, during the removing step, the intermetallic alloy layer is left in the removal zone over at least a portion of a height of the intermetallic alloy layer.

24. The method according to claim 19, wherein the welding is performed using a filler wire or a powder addition.

25. The method according to claim 24, wherein the filler wire or powder contains austenite-forming alloying elements.

26. The method according to claim 19, wherein, during the butt welding step, the first and second precoated steel sheets are arranged in such a manner that the second section of at least one of the precoated steel sheets faces a second section of the other precoated steel sheet.

27. A method for manufacturing a press-hardened steel part comprising the successive steps of:
carrying out the method according to claim 19 in order to obtain a welded blank;
heating the welded blank so as to obtain an at least partly austenitic structure in the precoated steel sheets constituting the welded blank;
hot forming the welded blank in a press to obtain a hot-formed steel part; and
cooling the steel part in the press so as to obtain a press-hardened steel part.

28. The method for manufacturing a steel part according to claim 27, wherein the cooling rate is equal to or greater than the critical martensitic or bainitic cooling rate of the steel sheets.

29. A precoated steel sheet comprising:
a steel substrate portion carrying, on at least one face, a precoating portion, the precoating portion including an intermetallic alloy layer portion and a metallic alloy layer portion extending atop the intermetallic alloy layer portion, the metallic alloy layer portion being a layer of aluminum, a layer of aluminum alloy or a layer of aluminum-based alloy, a thickness of the precoated steel sheet being between 0.8 mm and 5 mm, and
at least one laser cut edge surface, the laser cut edge surface comprising a substrate region and at least one precoating region,
the precoated steel sheet comprising, on the laser cut edge surface, a plurality of solidification striations,
the laser cut edge surface comprising a corrosion-improved zone, extending over an entire height of the laser cut edge surface and over a length smaller than or equal to a length of the laser cut edge surface,
a surface fraction of aluminum on the substrate region of the corrosion-improved zone is greater than or equal to 9% and a surface fraction of aluminum on a bottom half of the substrate region of the corrosion-improved zone is greater than or equal to 0.5%.

30. The precoated steel sheet according to claim 29, wherein the surface fraction of aluminum on the substrate region of the corrosion-improved zone is between 9% and 70%.

31. The precoated steel sheet according to claim 29, wherein the surface fraction of aluminum on the bottom half of the substrate region of the corrosion-improved zone is greater than or equal to 1.5%.

32. The precoated steel sheet according to claim 31, wherein a ratio of the surface fraction of aluminum on the substrate region of the corrosion-improved zone divided by the surface fraction of aluminum in the bottom half of the substrate region of the corrosion-improved zone is smaller than or equal to 5.5 and the surface fraction of aluminum on the substrate region of the corrosion-improved zone is greater than or equal to 11%.

33. The precoated steel sheet according to claim 29, wherein the corrosion-improved zone extends over the entire length of the laser cut edge surface.

34. The precoated steel sheet according to claim 29, wherein the length of the corrosion-improved zone is strictly smaller than the total length of the laser cut edge surface and the laser cut edge surface further comprises a second section extending over the entire height of the laser cut edge surface and over only a fraction of the length of the laser cut edge surface, and wherein the surface fraction of aluminum on the substrate region of the second section is between 0.3% and 6%.

35. The precoated steel sheet according to claim 29, wherein the thickness of the precoated steel sheet is between 1.0 mm and 1.8 mm.

36. The precoated steel sheet according to claim 35, wherein the thickness of the precoated steel sheet is between 1.0 mm and 1.5 mm.

* * * * *